(12) United States Patent
Dobkins

(10) Patent No.: US 11,704,995 B2
(45) Date of Patent: Jul. 18, 2023

(54) SYSTEMS AND METHODS FOR EMERGENCY EVENT CAPTURE

(71) Applicant: Steven Duane Dobkins, Key West, FL (US)

(72) Inventor: Steven Duane Dobkins, Key West, FL (US)

( * ) Notice: Subject to any disclaimer, the term of this patent is extended or adjusted under 35 U.S.C. 154(b) by 0 days.

(21) Appl. No.: 17/125,928

(22) Filed: Dec. 17, 2020

(65) Prior Publication Data

US 2021/0217292 A1 Jul. 15, 2021

Related U.S. Application Data

(60) Provisional application No. 62/949,014, filed on Dec. 17, 2019.

(51) Int. Cl.
*G08B 25/00* (2006.01)
*H04W 4/90* (2018.01)
*G08B 25/01* (2006.01)
*H04W 12/033* (2021.01)
*H04W 4/029* (2018.01)

(52) U.S. Cl.
CPC ......... *G08B 25/007* (2013.01); *G08B 25/016* (2013.01); *H04W 4/029* (2018.02); *H04W 4/90* (2018.02); *H04W 12/033* (2021.01)

(58) Field of Classification Search
CPC .... G08B 25/007; G08B 25/016; G08B 25/16; G08B 27/001; H04W 4/90; H04W 12/033; H04W 4/029; H04W 12/80
See application file for complete search history.

(56) References Cited

U.S. PATENT DOCUMENTS

| | | | |
|---|---|---|---|
| 7,184,744 B1* | 2/2007 | Schnabel | G01S 19/02 342/357.395 |
| 9,020,462 B2* | 4/2015 | Hodgson | H04M 1/72421 455/411 |
| 9,165,457 B1* | 10/2015 | Bertagnolli, Jr. | G08C 19/00 |
| 9,592,795 B1* | 3/2017 | Whiteside | G01S 19/13 |
| 10,909,830 B1* | 2/2021 | Stapleford | H04W 4/90 |
| 2008/0174418 A1* | 7/2008 | Wartofsky | G08B 29/185 340/514 |
| 2010/0245582 A1* | 9/2010 | Harel | G08B 13/19621 348/143 |
| 2011/0117878 A1* | 5/2011 | Barash | G08B 25/005 340/539.12 |
| 2013/0040600 A1* | 2/2013 | Reitnour | H04M 1/72424 455/418 |

(Continued)

*Primary Examiner* — Ojiako K Nwugo
(74) *Attorney, Agent, or Firm* — Camille A. Wilson; Wilson Dutra, PLLC

(57) ABSTRACT

An emergency event system may allow for the capture of emergency event data in real time. Users may be able to initiate capture when they believe they are in an emergency event, such as an assault, a robbery, a shooting, an automobile accident, or other threatening situation. In some aspects, when an emergency event is initiated, notifications may be sent out to third parties, such as emergency contact list or emergency response teams. Captured emergency event data may be transmitted and stored in an emergency event database, which may be accessible to third parties and third-party systems, such as for law enforcement. An emergency event capture device may comprise multiple cameras that may concurrently capture media.

8 Claims, 13 Drawing Sheets

(56) References Cited

U.S. PATENT DOCUMENTS

| | | | |
|---|---|---|---|
| 2015/0079924 A1* | 3/2015 | Lieu | H04W 4/90 |
| | | | 455/404.1 |
| 2015/0112883 A1* | 4/2015 | Orduna | G06Q 50/265 |
| | | | 705/325 |
| 2015/0147998 A1* | 5/2015 | Kamal | H04W 4/90 |
| | | | 455/404.2 |
| 2015/0245189 A1* | 8/2015 | Nalluri | G06F 16/951 |
| | | | 455/404.1 |
| 2015/0339911 A1* | 11/2015 | Coyne | H04N 7/181 |
| | | | 340/517 |
| 2016/0214553 A1* | 7/2016 | Benoit | H04M 1/72412 |
| 2017/0280280 A1* | 9/2017 | Jain | H04W 4/02 |
| 2018/0262897 A1* | 9/2018 | Hennessy | H04M 3/5116 |
| 2018/0332162 A1* | 11/2018 | Schutter | H04W 12/61 |
| 2019/0098555 A1* | 3/2019 | Winterton | H04W 40/244 |
| 2019/0109932 A1* | 4/2019 | Higgins | H04M 1/72424 |
| 2019/0174289 A1* | 6/2019 | Martin | H04W 4/90 |
| 2019/0387386 A1* | 12/2019 | Sethi | H04B 7/0426 |
| 2020/0118418 A1* | 4/2020 | Benjamin | G08B 25/016 |

\* cited by examiner

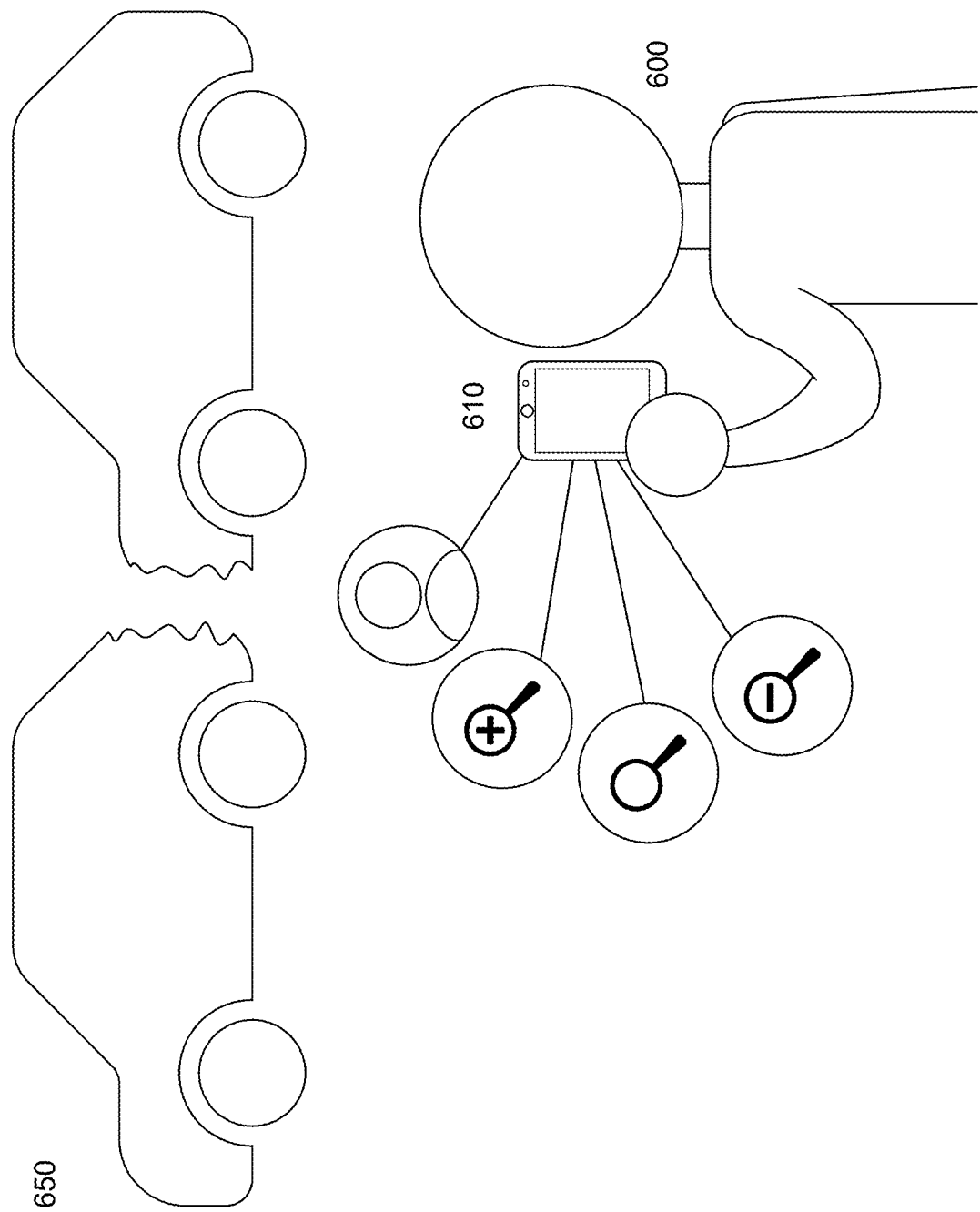

SYSTEMS AND METHODS FOR EMERGENCY EVENT CAPTURE

CROSS-REFERENCE TO RELATED APPLICATION

This application claims priority to and the full benefit of U.S. Provisional Patent Application Ser. No. 62/949,014, filed Dec. 17, 2019, and titled "SYSTEMS AND METHODS FOR EMERGENCY EVENT CAPTURE", the entire contents of which are incorporated in this application by reference.

BACKGROUND

Before the development of the rotary dial telephone, all telephone calls were operator-assisted. Operators would operate switchboards to manually connect a caller to the intended party they requested to speak to. Emergency calls were treated the same way, without a direct line or method of immediately dialing to, for example, report a fire or to contact the police. Once the rotary dial telephone was developed, countries started creating national emergency telephone numbers to directly connect callers to emergency service dispatchers and operators. Callers are normally connected to a public safety answering point ("PSAP") where an operator then triages and sends emergency responders based on the caller's provided information.

One of the first countries to use a national emergency telephone number was the United Kingdom in the $20^{th}$ century. North America started using the United Kingdom's emergency telephone number (999) before adopting the present emergency telephone number (911) in the late 1960s. In the United States, the implementation of a national emergency telephone number took several years. According to the National Emergency Number Association, 98.9% of the United States population has access to the national emergency telephone number as of December 2017.

With an emergency telephone number becoming more widespread, countries are experimenting with different ways to facilitate access to the emergency telephone number or providing more information to a dispatcher. For example, some callers may be able to text the emergency telephone number instead of calling. In some instances, dispatchers may have access to a caller's location or telephone number. Dispatchers may use computer-aided dispatch to record what services are requested or sent out, such as fire, emergency medical, or police. The computer-aided dispatch can send messages, store and retrieve data, and communicate to field units.

Despite the advancements of having access to a national emergency phone number, the proliferation of cell phones has created new issues to solve. For example, calls from a cell phone have made it more difficult to accurately triangulate a caller's location. National emergency services still have issues authenticating caller information or verifying that the information provided is accurate. Some callers misuse the system, straining dispatchers at PSAPs and hampering them from answering more calls more quickly. The approach for solving these issues vary greatly, going from something as local as a neighborhood to a municipality and beyond. Change can come from leveraging opportunities from both sides of an emergency: from the caller side and from the dispatcher or emergency service provider side.

SUMMARY OF THE DISCLOSURE

What is needed is a method and system for emergency event capture. This may include a method and system for collecting, organizing, and transmitting emergency information to an intended recipient, whether that be a caller, a dispatcher, emergency service provider, or investigative unit. In some embodiments, a user may provide a recipient with visual confirmation of a reported event, such as through photographs or video. In some implementations, a user may provide a recipient with a live stream of an ongoing or reported event. In some aspects, a recipient may provide or forward user information to another party. In some embodiments, an organization may access saved, archived, or recorded information within a database. In some implementations, an organization may access information by searching information tagged or marked by the system. In some aspects, the system may tag data as it is uploaded.

In some embodiments, the system may aggregate local data from multiple users to inform the recipient of concurrent or local events. For example, the system may be informed that multiple users have reported seismic activity within a designated area within the last 10 to 15 minutes. In some implementations, the system may pull information from other active or running applications to inform the user or recipient of activity to be area of or to more accurately locate the user. In some implementations, the system may triangulate an emergency and push the reported activity to warn other users. For example, the police department may have issued a warning about an active shooter situation. The system may use geofencing or geolocation to warn users who are in that area to leave. In some aspects, the system may warn users who come within a geofenced area of any emergencies in the area.

The following communication system may be used to notify both first responders and potential victims about both immediate threats and non-emergencies occurring in their area. Using top of the line cameras, microphones, and connecting to each individual notification device (cell phone, tablet, computer, etc.), the communication network may allow for quick response times from authorities, alerting all potential victims without alerting the perpetrator. The communication system may save all recorded data files, including audio, visual and all other media recordings directly to a local database or backup hard drive. The communication system may use real time alert systems that include live notifications, visual maps, local authority updates and safe evacuation routes for those in need.

Using an automated system, the communication network may prioritize each notification based on level of importance and may be controlled manually for a more desired use. The communication system provides a real time update to authorities and victims, cutting out the uncertainty of where the threat is and minimalizing the response time using immediate alerts to all parties. Lastly, the emergency event capture device may allow individual users to trigger the system when threatened or when in danger to not only alert other potential victims, and emergency response teams while simultaneously recording all media of the emergency.

The present disclosure relates to an emergency event capture. The emergency event may comprise a plurality of external servers configured to receive and store captured emergency event data received from a plurality of emergency event capture devices; and a first emergency event capture device configured to capture emergency event data of an emergency event The first emergency event capture device may comprise: a plurality of cameras, where each camera captures a predefined view, a microphone configured to capture audio, a geolocation mechanism, a wireless communication mechanism, memory storage, and executable software configured to: prompt collection of emergency event data, where collection occurs through two or more of the plurality of cameras, the geolocation mechanism, and the microphone, prompt storage of emergency event data in the memory storage, where transmit at least a portion of the emergency event data to at least a portion of the plurality of external servers.

Implementations may comprise one or more of the following features. The system where the executable software may be further configured to prompt encryption of emergency event data, where encryption prevents access to emergency event data. Storage of emergency event data may prevent local access to emergency event data. Collection of emergency event data occurs concurrently. The executable software may be configured to prompt an emergency event capture notification that indicates emergency event capture. The emergency event capture notification may comprise a dying battery icon. The servers are configured to transmit emergency event notifications to a plurality of external devices, where the emergency event notifications may comprise predefined information from emergency event data.

The present disclosure relates to a method for capturing emergency event data. The method may comprise receiving an emergency event notification; and receiving emergency event data from a first emergency event capture device, where the first emergency event capture device may comprise: a plurality of cameras, where each camera captures a predefined view, a microphone configured to capture audio, a geolocation mechanism, a wireless communication mechanism, where emergency event data may be collected concurrently from a least two of the plurality of cameras, the microphone, and the geolocation mechanism. The method includes storing emergency event data.

The method may comprise receiving emergency event data request for at least a portion of emergency event data; and transmitting at least the portion of emergency event data. Correlating may align emergency event data by emergency event and by time. The method may comprise collecting correlated emergency event data into an emergency event data packet. The method may comprise tagging the emergency event data packet with predefined emergency event identifiers may comprise at least the emergency event, date, and time of the emergency event. The method may comprise separating emergency event data, and analyzing separated emergency event data based on predefined parameters. The method may comprise analyzing emergency event data captured concurrently from the plurality of cameras, and extracting predefined details based on camera criteria.

The present disclosure relates to a method for capturing emergency event data receiving an emergency event notification from an emergency event capture device, where the emergency event capture device may comprise: a plurality of cameras, where each camera captures a predefined view, a microphone configured to capture audio, a geolocation mechanism, a wireless communication mechanism, memory storage, and executable software. The method may comprise prompting capture of emergency event data by the emergency event capture device based on predefined parameters, where predefined parameters select two or more of the plurality of cameras, the microphone, and the geolocation mechanism to capture emergency event data concurrently; storing emergency event data, where storage prevents access to emergency event data; and transmitting emergency event data to an external server.

The method may comprise encrypting emergency event data. Capture of emergency event data may occur through at least two of the plurality of cameras, and where capture occurs concurrently. The plurality may comprise a focused lens, a normal lens, and a wide lens. One of the at least two of the plurality of cameras may comprise a front-facing camera. The memory storage may comprise media, where at least a portion of media may comprise media of a first user, and the method further may comprise: identifying a second user in at least a portion of emergency event data captured by the front-facing camera; identifying the first user in at least a portion of media; comparing the first user to the second user; assessing whether the first user may be second user; and attaching the assessment to emergency event data captured concurrently with at least the portion of emergency data captured by the front-facing camera. Implementations of the described techniques may comprise hardware, a method or process, or computer software on a computer-accessible medium.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 6A illustrates an exemplary emergency event capture, according to some embodiments of the present disclosure.

DETAILED DESCRIPTION

Figure 1B:
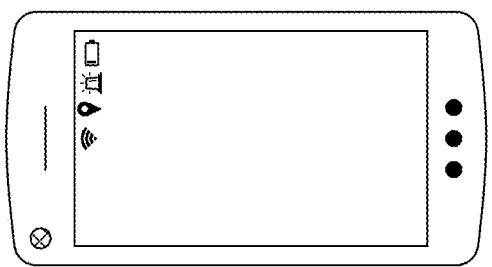
FIG. 1B illustrates an exemplary notification device, according to some embodiments of the present disclosure.

The present disclosure provides generally for an emergency event capture and communication system that may help potential and current victims in an emergency. According to the present disclosure, the emergency event system may send notifications to victims and emergency responders, which may include police, fire department, secret service, as non-limiting examples. The emergency event system may have one or multiple notification devices that transmit alerts and notify possible victims or victim's contacts. The emergency event system may simultaneously alert authorities using internal servers and databases compiled with an automated system that may not have to be controlled manually. The communication system may transmit to locally connected mobile devices, including but not limited to, cellular phones, desktop and laptop computers, as well as tablets. The system may be used to save potential victims of the emergency as well as notify officials faster.

In the following sections, detailed descriptions of examples and methods of the disclosure will be given. The description of both preferred and alternative examples though thorough are exemplary only, and it is understood that to those skilled in the art variations, modifications, and alterations may be apparent. It is therefore to be understood that the examples do not limit the broadness of the aspects of the underlying disclosure as defined by the claims.

Glossary

Emergency Event: as used herein refers to any event or incident that prompts a user to initiate the emergency event capture. An emergency event may comprise a situation where a user may be injured, feel threatened, or may be in danger. An emergency event may comprise a situation where the user sees someone else in danger, injured, threatened, or somehow in need of emergency assistance. In some aspects, an emergency event may be broadcast to those within a certain radius of the emergency event. This may alert others to where an emergency event is happening.

Emergency Event Capture: as used herein refers to any data captured in response to an emergency event. In some aspects, emergency event capture may record media, such as audio, video, or images. In some embodiments, emergency event capture may comprise situational data, such as GPS coordinates, date, or time. In some implementations, emergency event capture may comprise data related to the user, the potential or alleged victim, the potential or alleged perpetrators, potential witnesses, or combinations thereof. In some aspects, emergency event capture may occur concurrently with the emergency events, and in some implementations, emergency event capture may occur after the emergency event, such as by direct user input or analysis of data captured during the emergency event. For example, images captured during the emergency event may be analyzed to determine that the alleged perpetrator was wearing attire typically associated with a specific gang, was approximately six foot, and had long blond hair.

Emergency Event Data: as used herein refers to any data captured during an emergency event. In some aspects, emergency event data may comprise media, such as video data, image data, or audio data, as non-limiting examples. In some embodiments, emergency event data for an emergency event may be captured by a single user. In some implementations, emergency event data for an emergency event may be captured by multiple users.

Figure 1C:
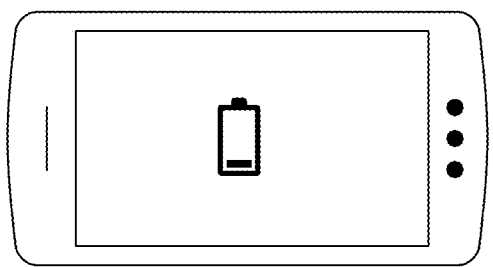
FIG. 1C illustrates an exemplary notification device, according to some embodiments of the present disclosure.
Figure 1A:
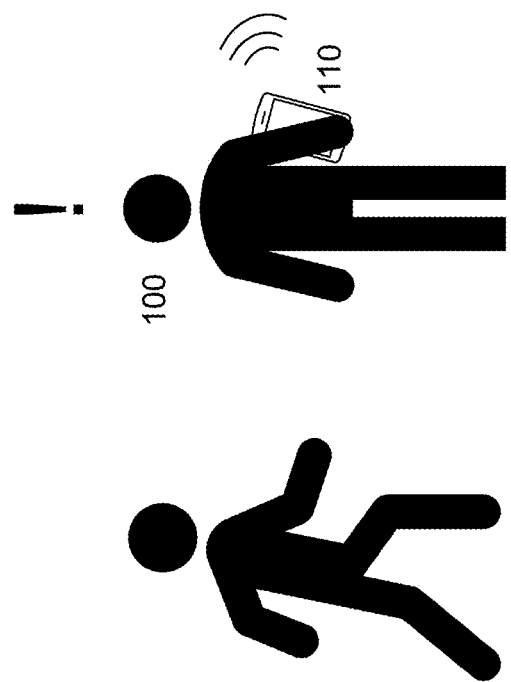
FIG. 1A illustrates an exemplary emergency event, according to some embodiments of the present disclosure.

Referring now to FIGS. 1A to 1C, an exemplary emergency event is illustrated. In some embodiments, a user 100 may detect an emergency event and initiate an emergency event capture device 110. In some aspects, a user 100 may trigger an emergency event capture device 110. In some implementations, a user 100 may feel threatened or in danger and identify a moment as an emergency event. In some embodiments, a user 100 may trigger an emergency event capture device 110 to notify emergency response for a faster response time. In some implementations, an emergency event capture device 110 may trigger media cameras and microphones that may help capture emergency event data. In some aspects, an emergency event capture device 110 may be used to transmit the emergency event data for future reference. For example, the emergency event data may be used to help the police find victims or suspects; help a jury convict a defendant in court; or to confirm conditions on the day the emergency event occurred, such as whether it was raining.

In some embodiments, an emergency event capture device 110 may comprise a standalone device. In some aspects, an emergency event capture device 110 may be integrated with an existing smart device such as a smart phone, laptop, or tablet, as non-limiting examples. In some implementations, an emergency event capture system may notify a smart device via a "secret notification" to prevent a potential threat (active shooter, bomb threat, hostage situation) from being notified as well. As exemplified in FIG. 1C, a "secret notification" may be a dying battery notification, or a social media notification that alerts the potential victims about the perpetrator.

In some aspects, an emergency event capture device 110 may trigger a special vibration pattern to alert other potential victims about a perpetrator. In some implementations, an emergency event capture device 110 may produce a unique flashing color that triggers on the mobile device to alert potential victims. In some embodiments, a "secret notification" may simultaneously inform the potential victims quietly while notifying emergency officials.

In some implementations, a notification to emergency officials may be based on location. For example, an emergency event system may prioritize notifying local officials for faster response times to the immediate threat. In some aspects, an emergency event system may notify officials simultaneously or in real-time within a limited distance where an emergency event is happening. For example, officials may be notified within a ten-mile radius.

In some aspects, an emergency event capture device 110 may notify potential victims about other emergencies, such as, earthquakes, tornados, fires, as non-limiting examples. In some implementations, an emergency event system may include different types of notifications for different levels of threats. In some embodiments, an emergency event system may prioritize the levels automatically, such as through pre-processing emergency event data.

Figure 2:
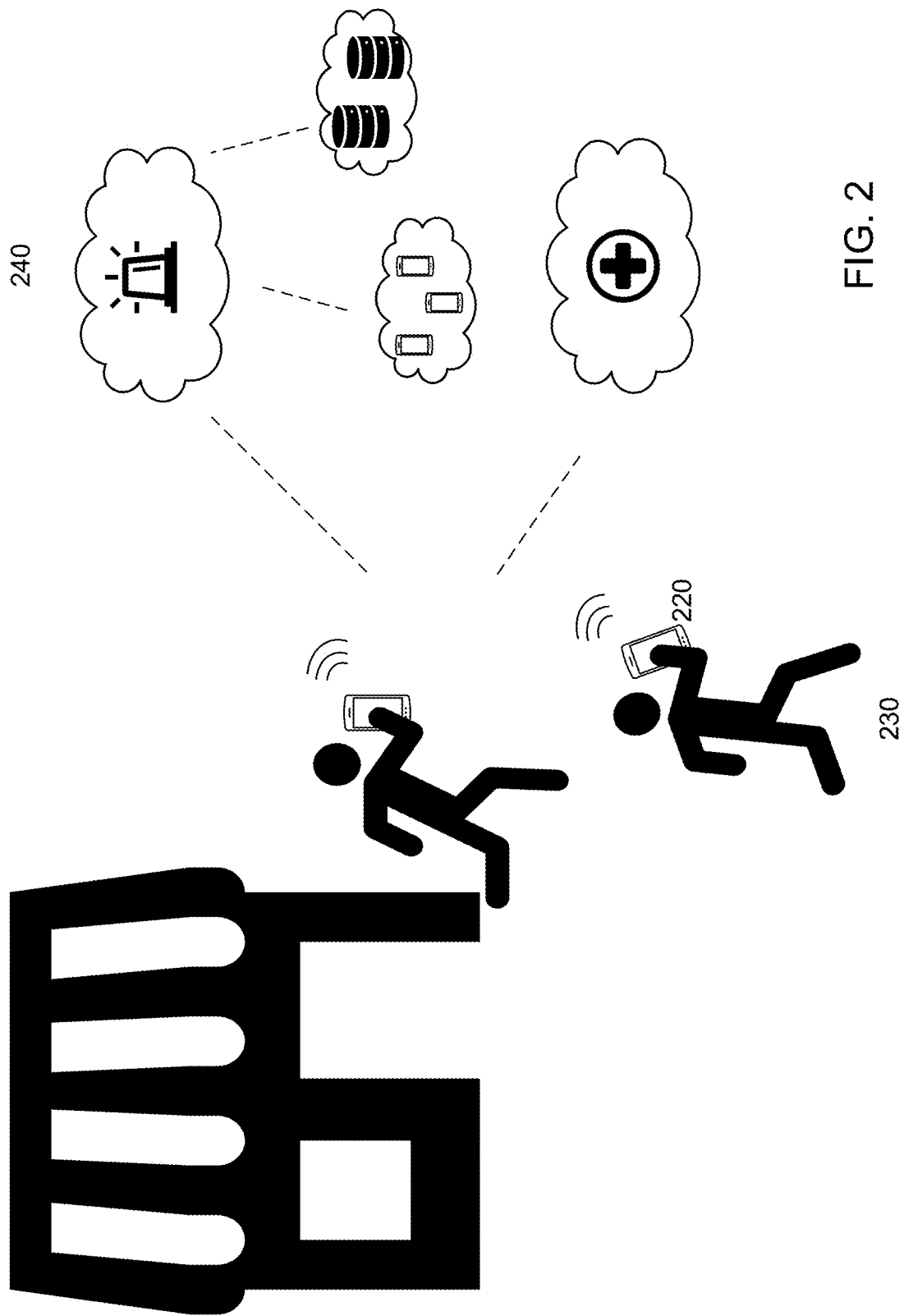
FIG. 2 illustrates an exemplary alert system for users, according to some embodiments of the present disclosure.

Referring now to FIG. 2, an exemplary emergency event with multiple emergency event captures is illustrated. In some embodiments, an emergency event capture device 220 may alert potential victims to flee from a situation where a potential threat may be occurring. In some implementations, an emergency capture system may alert emergency officials about an emergency event in progress. In some aspects, captured emergency event data 240 may be aggregated and stored as a single emergency event, which may allow for more efficient access to the emergency event data. For example, law enforcement or investigators may be able to sort the emergency event data 240 by a specific event and view all the captured emergency event data 240 for that particular event. The emergency event data 240 may be further sorted or filtered by other criteria, such as by user, emergency event data type, time stamp of the captured emergency event data 240, or location of the emergency event capture device 220 during the emergency event, as non-limiting examples.

In some embodiments, an emergency event capture device 220 may notify officials about a potential threat while simultaneously notifying potential victims. In some implementations, an emergency event capture aggregation system may take all possible notifications and push them to different databases, allowing for first responders and potential victims to act promptly. In some embodiments, a potential victim may manually contact authorities based on the level of the threat. In some implementations, an emergency event capture device 220 may include an emergency contact button so that a potential victim may manually contact authorities. In some aspects, an emergency event capture device 220 may provide a variety of first responders to contact first based on the emergency event being captured. For example, if a bystander or victim records a fire in progress, the emergency event system may flag that fire fighters would be the best first point of contact.

In some embodiments, an emergency event system may prioritize what first responders may be the most relevant or important for addressing an emergency event in progress and reach out accordingly. In some implementations, an emergency event system may provide suggestions to first responders that they can determine whether to act on. In some aspects, an emergency event system may coordinate with a first responder or call center to contact the proper authorities or responders for a particular emergency event. In some embodiments, an emergency event system may push a bulletin on social media or news outlets or push notifications to alert others about an emergency event in progress.

In some aspects, if an emergency event capture device 220 is falsely triggered, the communication system may automatically override the contact to authorities and promptly inform all potential victims to disregard the notifications. In some implementations, emergency officials may be contacted first if the threat is not immediate. For example, if there may be suspicious activity or a threat not yet taken by the perpetrator. For example, someone may have left a bag in a crowded place, a person may be witnessing a verbal altercation that has not escalated into a physical scuffle, or a person may be witnessing a potential domestic abuse situation where an abuser is trying to enter a home.

In some embodiments, a user 230 may actively trigger an emergency event capture device 220 while fleeing the scene of an emergency. In some implementations, a user 230 may trigger an emergency event capture device 220 to notify other potential victims that may be in danger at the scene of an emergency. In some aspects, notifications may be sent out to other users of the emergency event system within a predefined geographic range or area. In some embodiments, an emergency event system may be tied to government broadcasting, similarly to Amber alerts, and emergency event notifications may be transmitted to any person with a communication device within a predefined vicinity.

In some aspects, an emergency event capture device 220 may trigger a notification of emergency response, an emergency event data capture, and transmittal of captured media for future reference despite not being connected to LAN, Wi-Fi, or any other internet connection. This may allow the user 230 to trigger the emergency event capture device 220 from a safe distance away from the event location. In some implementations, any data captured may be streamed or transmitted using cellular data.

In some embodiments, emergency event data may be transmitted to the emergency event system, which may then transmit notifications to third parties, such as those identified by a user. In some aspects, first responders may be contacted directly, wherein one or more emergency event data may be sent to the first responder system. Contact with the first responders may be directly connected, which may allow the first responder to communicate with a user, if the user is in an emergency event that permits communication, or to access emergency event data in real time to assess threats during the emergency event.

Figure 3:
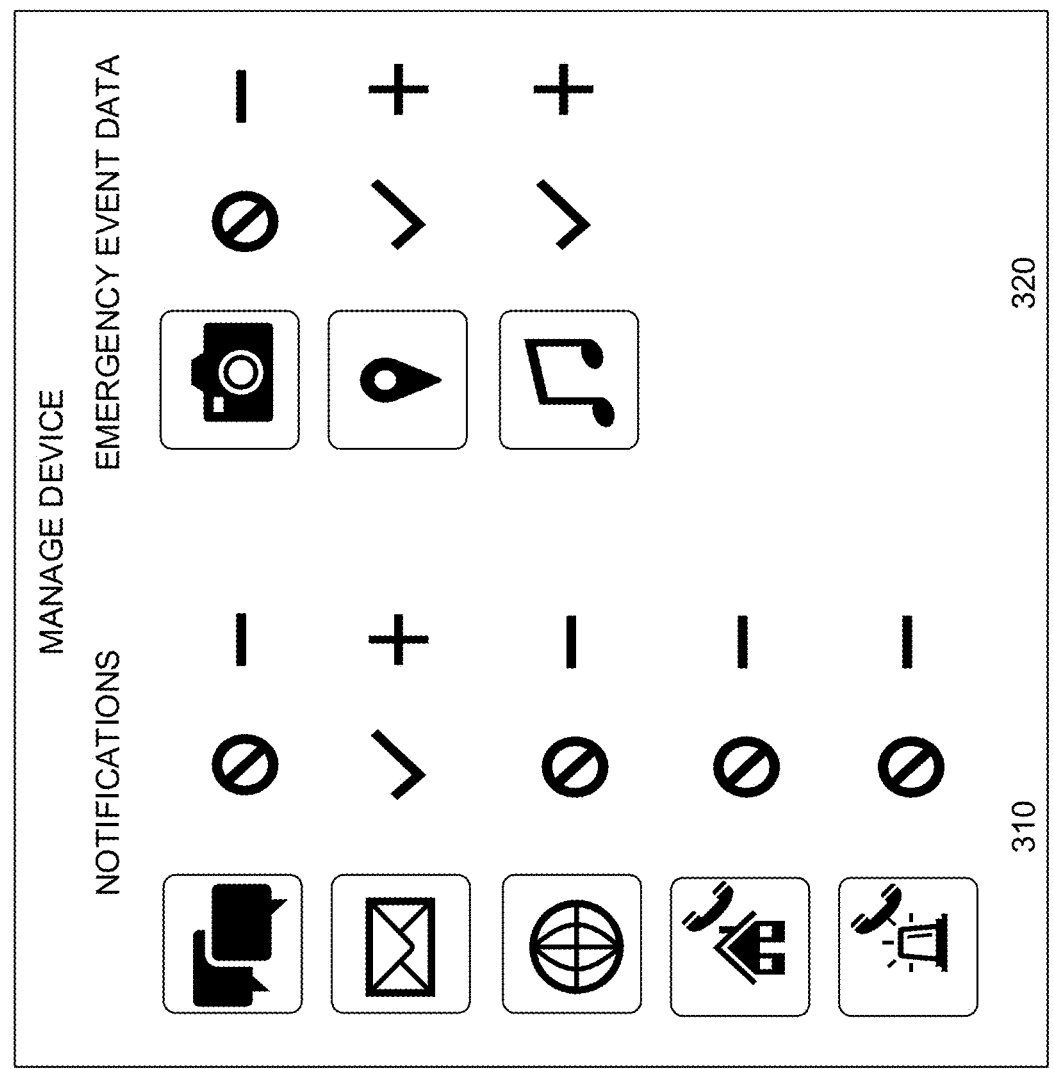
FIG. 3 illustrates an exemplary management system for users, according to some embodiments of the present disclosure.

Referring now to FIG. 3, an exemplary emergency device manager interface 300 is illustrated. In some embodiments, users may customize what notifications, records, and emergency event data are visible on their personal device. In some implementations, an emergency device manager interface 300 may be customized specifically by each user on each individual emergency event capture device. In some aspects, an emergency device manager interface 300 may include an override system where the main communication system owner is able to customize each emergency event capture device from the home data base.

In some embodiments, a user may activate capture of all emergency event data 320. In some implementations, emergency event data may include video, audio, and location services, as non-limiting examples. In some implementations, an emergency device manager interface 300 may have a single interaction or interface that activates all notifications 310 and all emergency event data 320, to save time and allow for abrupt documentation and precise notifications.

In some aspects, a user may be able to toggle activation of various types of notifications. For example, a user may want to send notifications of emergency events to identified people on their contact list, and the user may select emails and text, which may allow access to those functions on the emergency event capture device. In some embodiments, a user may control access to call functionality, potentially allowing for calls to first responders but not to their contact list. In some implementations, the communication functions may utilize the typical applications associated with each communication type, such as email, calls, or texts. In some embodiments, the communication functions may be performed within the emergency event system.

Figure 4:
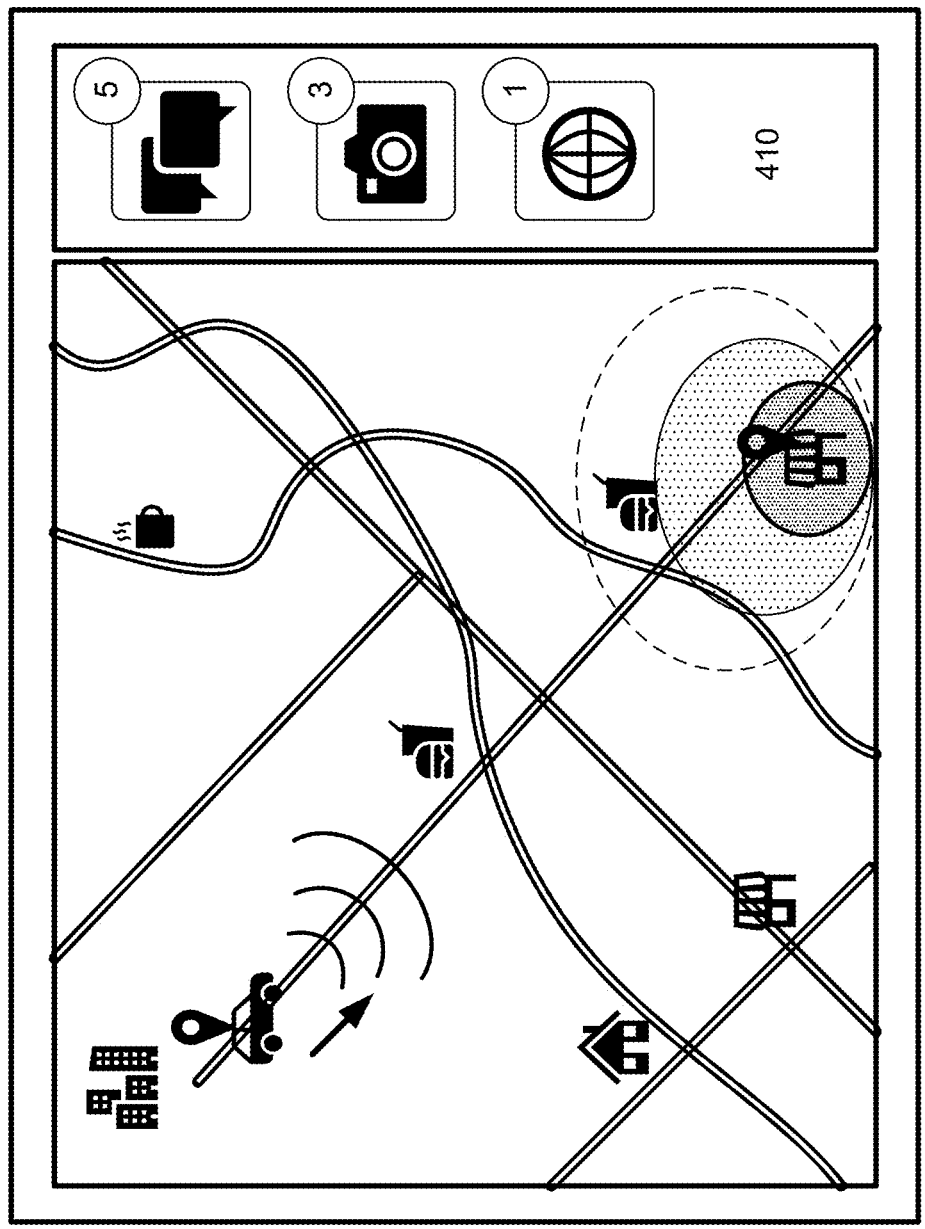
FIG. 4 illustrates an exemplary tracking system, according to some embodiments of the present disclosure.

Referring now to FIG. 4, an exemplary emergency event map 400 with a notification board 410 is illustrated. In some embodiments, an exemplary emergency event map 400 with a notification board 410 may assist emergency contacts, other users, and potential victims during emergency events. In some aspects, an emergency event map 400 may show active emergency events in real time, which may allow a user to respond accordingly, such as by vacating an area, avoiding an area, or triggering capture of a proximate emergency event.

In some embodiments, a notification board 410 may inform a user that an emergency response team has been notified. In some aspects, a notification board 410 may notify a user that all media of the emergency event capture system have been activated. In some implementations, a notification board may record all video and audio of the emergency event occurring. In some embodiments, a notification board 410 may inform a user when a recording starts and stops. In some implementations, a notification board 410 may inform the file name and location of where the media has been saved.

In some embodiments, an emergency event map 400 may be displayed on both first responders' and victims' mobile devices. In some implementations, an emergency event map 400 may include the location of an emergency event or the estimated time of arrival of all first responders. In some aspects, an exemplary emergency event map 400 may include a real time movement speed of all parties involved and have a notification board 410 displayed on the side of the screen.

In some embodiments, a notification board 410 may display active notifications, active video, and active alerts from first responders. In some implementations, a user may click on any displayed action listed on the notification board 410, and the device may take the user to the selected destination. In some aspects, a user may update other users on the communication system from observing the map and then clicking on the messaging system in the notification board 410 tab. In some embodiments, an individual user may notify emergency officials where the immediate threat is located. For example, an individual may double tap somewhere on a live emergency event map 400 or circle a specific location on the map, as non-limiting examples.

In some implementations, the emergency event map 400 may highlight a safe route for the possible victims to evacuate. In some aspects, there may exist some predetermined safe routes programmed manually beforehand based on level or type of threat. In some embodiments, authorities may provide live updated routes for safe exits. In some implementations, the emergency event map 400 may update based on how other victims escaped from the emergency event vicinity.

Figure 5B:
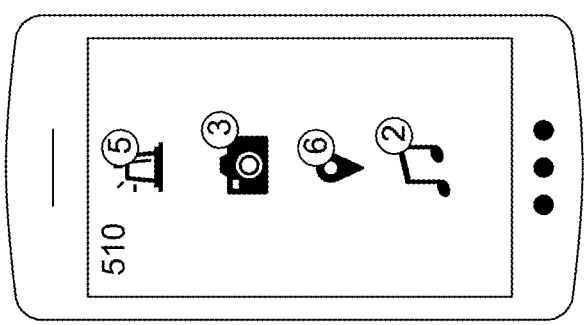
FIG. 5B illustrates an exemplary user upload interface, according to some embodiments of the present disclosure.
Figure 5A:
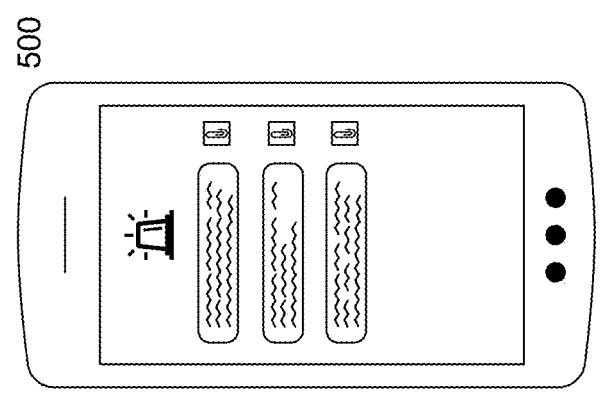
FIG. 5A illustrates an exemplary emergency event log interface, according to some embodiments of the present disclosure.

Referring now to FIGS. 5A-5B, different views within an emergency event capture device 500 are illustrated. In some embodiments, emergency event logs 510 may display for captured emergency events. In some aspects, emergency event logs 510 may provide a brief description of the emergency event. In some implementations, the emergency event logs 510 may display emergency events that a user has captured. The emergency event logs 510 may display all emergency events captured and may be filtered or sorted by date, location, emergency event types, or user, as non-limiting examples.

In some aspects, emergency event logs 510 may display information related to emergency events captured by the user and may include information received from other users. For example, for a bomb threat, a user may see how many people captured emergency event data, what types of data was captured, and any resolution associated with the emergency event. In some implementations, emergency events may be defined automatically by the emergency event system. The emergency event data may be processed for overlapping content, wherein overlapping content may help define the emergency event. For example, emergency event data for the same emergency event may comprise similar times and location information.

In some embodiments, an emergency event capture device 500 may accumulate a log of all notifications, including non-emergency notifications 510. In some implementations, non-emergency notifications 510 may include system updates, important updates on workplace environment issues, or possible hazardous issues near the area, as non-limiting examples.

In some aspects, an emergency event capture device 500 may capture passive media depending on what was triggered by the system. In some implementations, whether an emergency event capture device 500 captures passive media may depend on the level of threat or emergency the communication system has deemed appropriate. In some embodiments, an emergency event capture system may record every time a user triggers an emergency event capture device 500 or when they are within the radius of an emergency event.

In some embodiments, an emergency event capture device 500 may notify a user when recordings are triggered. In some implementations, this may be shown on the notification tab and may show how many users are recording at one time, or how many users have initiated recording. In some aspects, the emergency event capture device 500 may show how many files have been saved about the ongoing emergency by various users. In some embodiments, access to emergency event data may be limited for users. This may limit user ability to tamper with or share secure information about emergency events. Captured emergency event data may be automatically removed from local storage after transmission, and before transmission, the emergency event data may be hidden and inaccessible to limit the risk of accidental or deliberate tampering or deletion of the emergency event data.

Figure 6B:
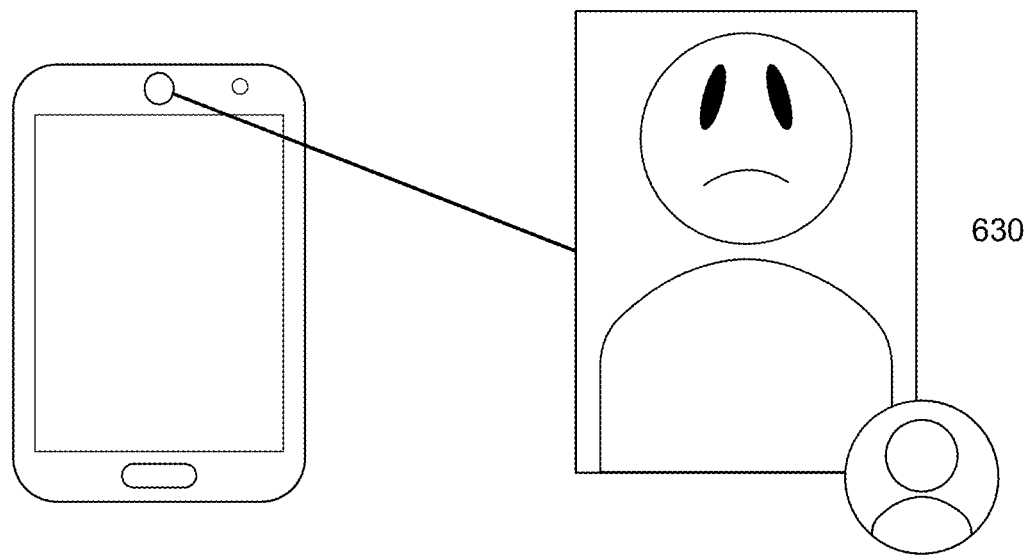
FIG. 6B illustrates exemplary emergency event data, according to some embodiments of the present disclosure.
Figure 6C:
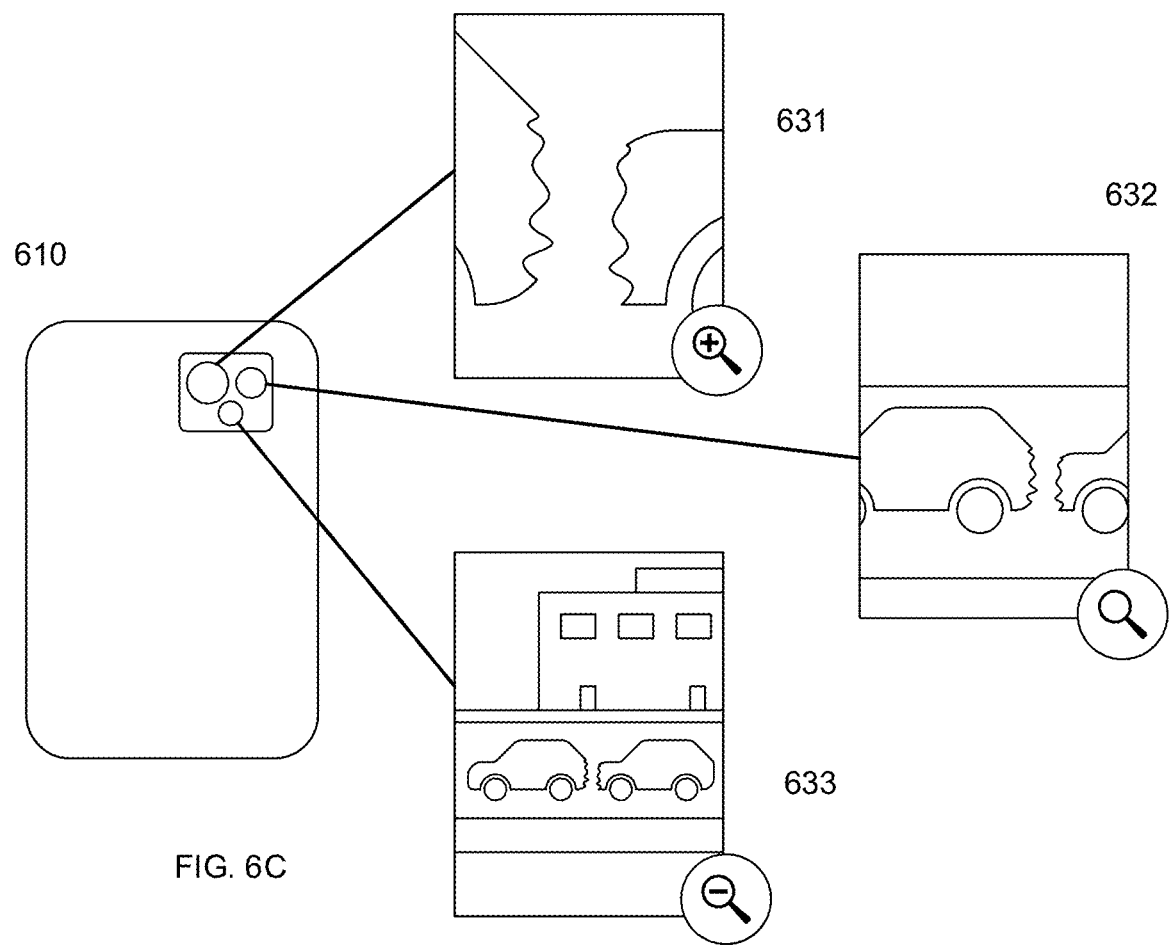
FIG. 6C illustrates exemplary emergency event data, according to some embodiments of the present disclosure.

Referring now to FIG. 6A, an exemplary emergency event 650 capture is illustrated. Referring now to FIGS. 6B and 6C, exemplary emergency event data 630, 631, 632, 633 is illustrated. In some aspects, front camera captured event data 630 may capture media from the front facing camera of the media capture device 610, which may typically include an image of a user 600. In some embodiments, the media captured from the front camera 630 may be compared to stored user media, such as photographs or videos. This may limit risk of false or staged reporting of emergency event 650 capture. The user 600 may be identified and confirmed, which may increase security and validity of the emergency event data 630, 631, 632, 633.

In some aspects, the focused camera event data 631 may have a closer view than other media captures. In some embodiments, the focused camera event data 631 may identify markings, specific numbers, dents, or license plate numbers, as non-limiting examples. In some implementations, the normal camera event data 632 may comprise normal view media of the emergency event 650. In some embodiments, this media may be saved into its own labeled folder separate from other media views. In some implementations, the wide camera event data 633 may comprise a wider view of the emergency event 650. In some aspects, the media may capture background details, landmarks, and other non-limiting examples.

In some embodiments, the media capture device 610, may comprise three different emergency event data 630, 631, 632, 633 capture devices that may capture different angles, views, and details of the emergency event 650. In some embodiments, the different media may be saved in different folders correlating to their respective views. For example, the wide camera event data 633 may be saved in a separate folder from the focused camera event data 631. In some implementations, these folders may be organized chronologically, data size, media type, or any other non-limiting example.

Figure 7A:
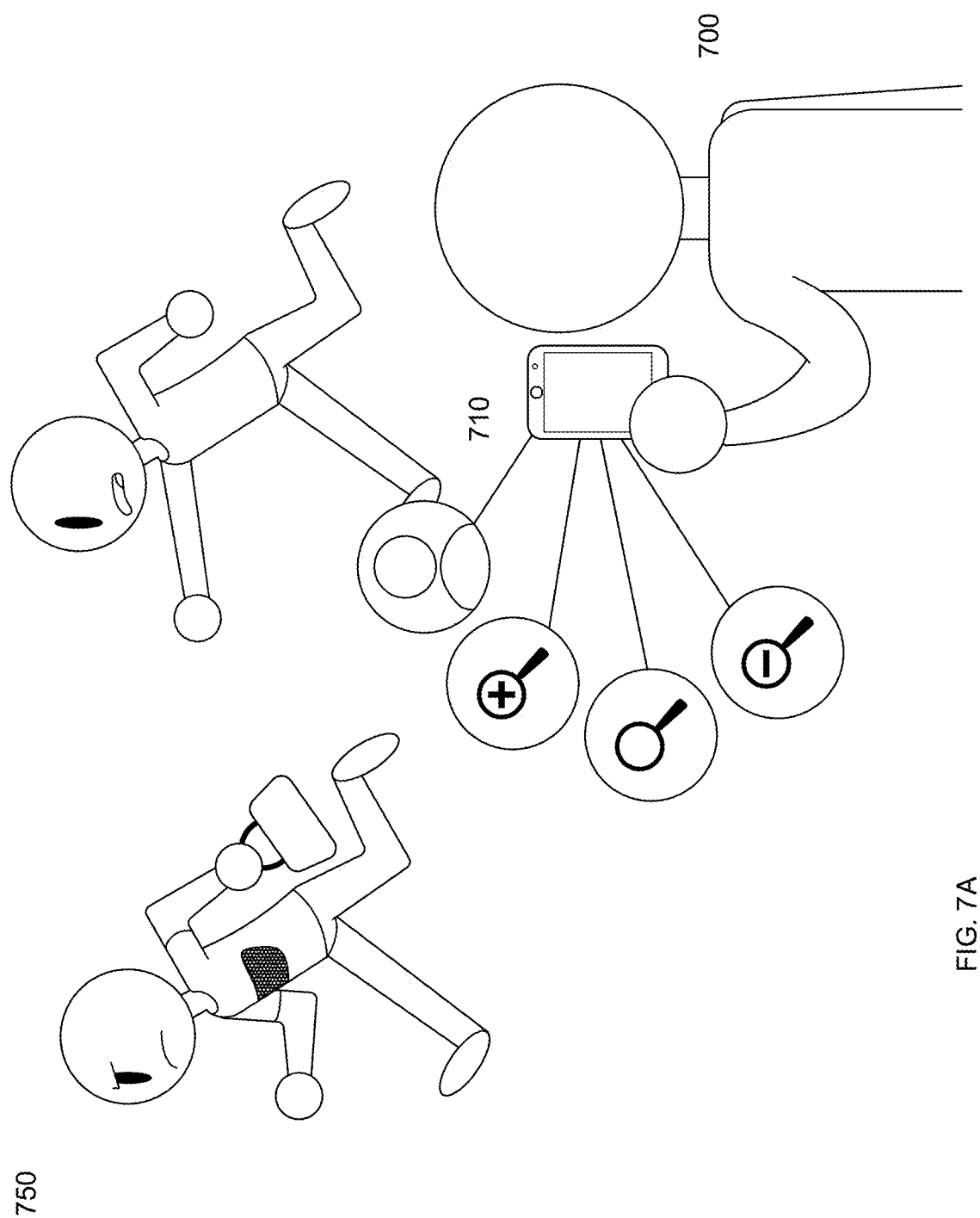
FIG. 7A illustrates an exemplary emergency event capture, according to some embodiments of the present disclosure.
Figure 7B:
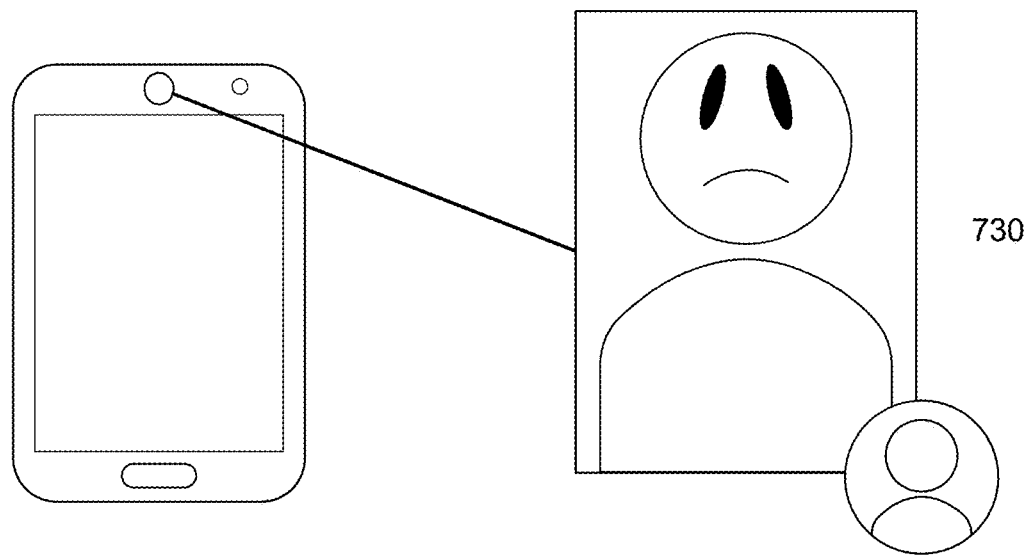
FIG. 7B illustrates exemplary emergency event data, according to some embodiments of the present disclosure.
Figure 7C:
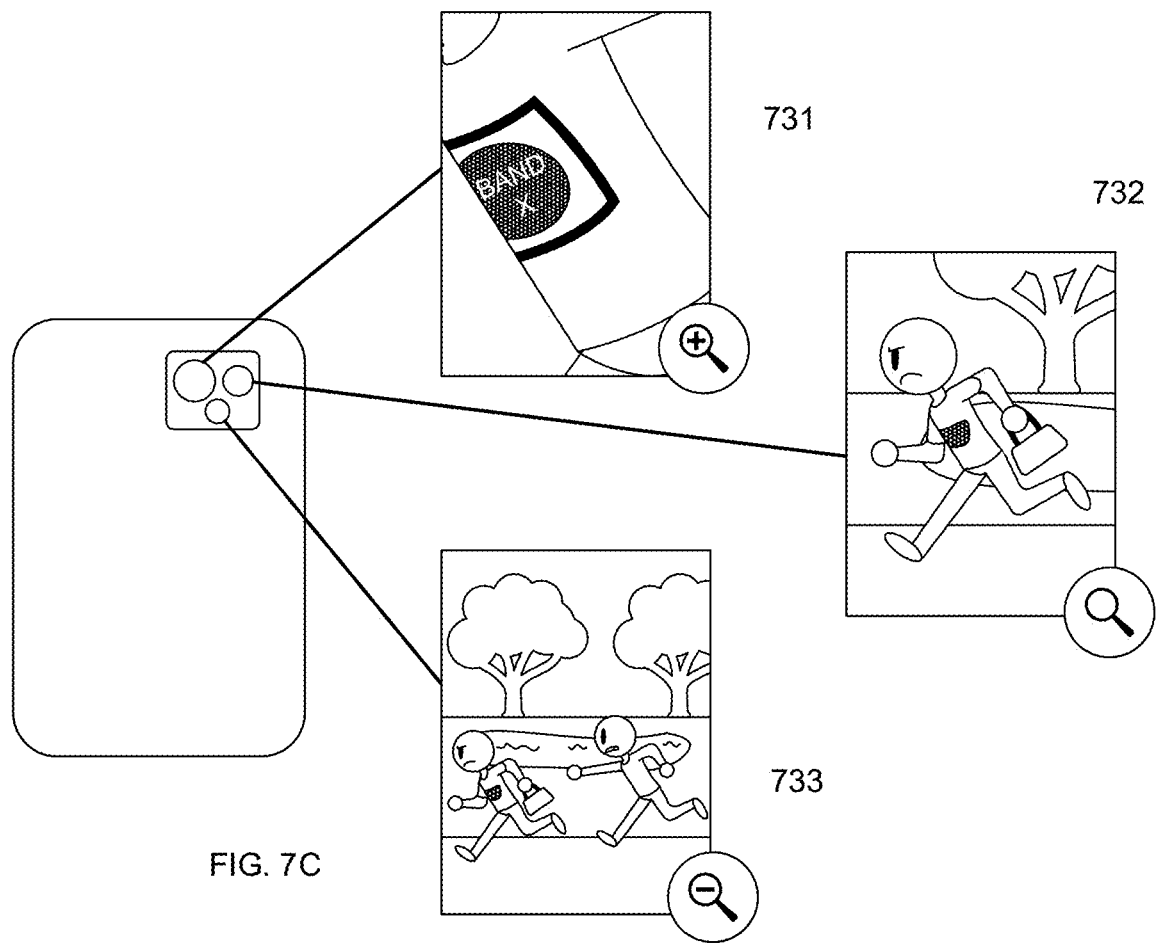
FIG. 7C illustrates exemplary emergency event data, according to some embodiments of the present disclosure.

Referring now to FIG. 7A, an exemplary emergency event capture is illustrated. Referring now to FIGS. 7B and 7C, exemplary emergency event data is illustrated. In some embodiments, front camera capture data 730 may capture media from the front facing camera of the media capture device 710. In some aspects, the front camera capture data 730 may record even when the media capture device 710 is turned off or locked. In some implementations, the front capture data 730 may record facial features, facial expressions, or background objects, as non-limiting examples. In some embodiments, the focus camera capture data 731 may capture close up details related to the emergency event 750. In some embodiments, the media captured may comprise clothing details, facial markings, tattoos, and other non-limiting examples.

In some aspects, the normal capture data 732 may capture a traditional view of the emergency event 750. In some implementations, the normal capture data 732 may rely more on the emergency event 750 to capture details in the immediate area. In some implementations, the wide capture data 733 may capture less focused media around the emergency event 750. In some embodiments, the wide capture data 733 may focus on details in the background of the emergency event 750. For example the wide capture data 733 may capture street signs, buildings, surrounding objects and other non-limiting examples. In some embodiments, the emergency event data 730, 731, 732, 733 may be saved in separate organized folders. For example, the folders may be organized chronologically, data size, media type, and other non-limiting examples.

Figure 8:
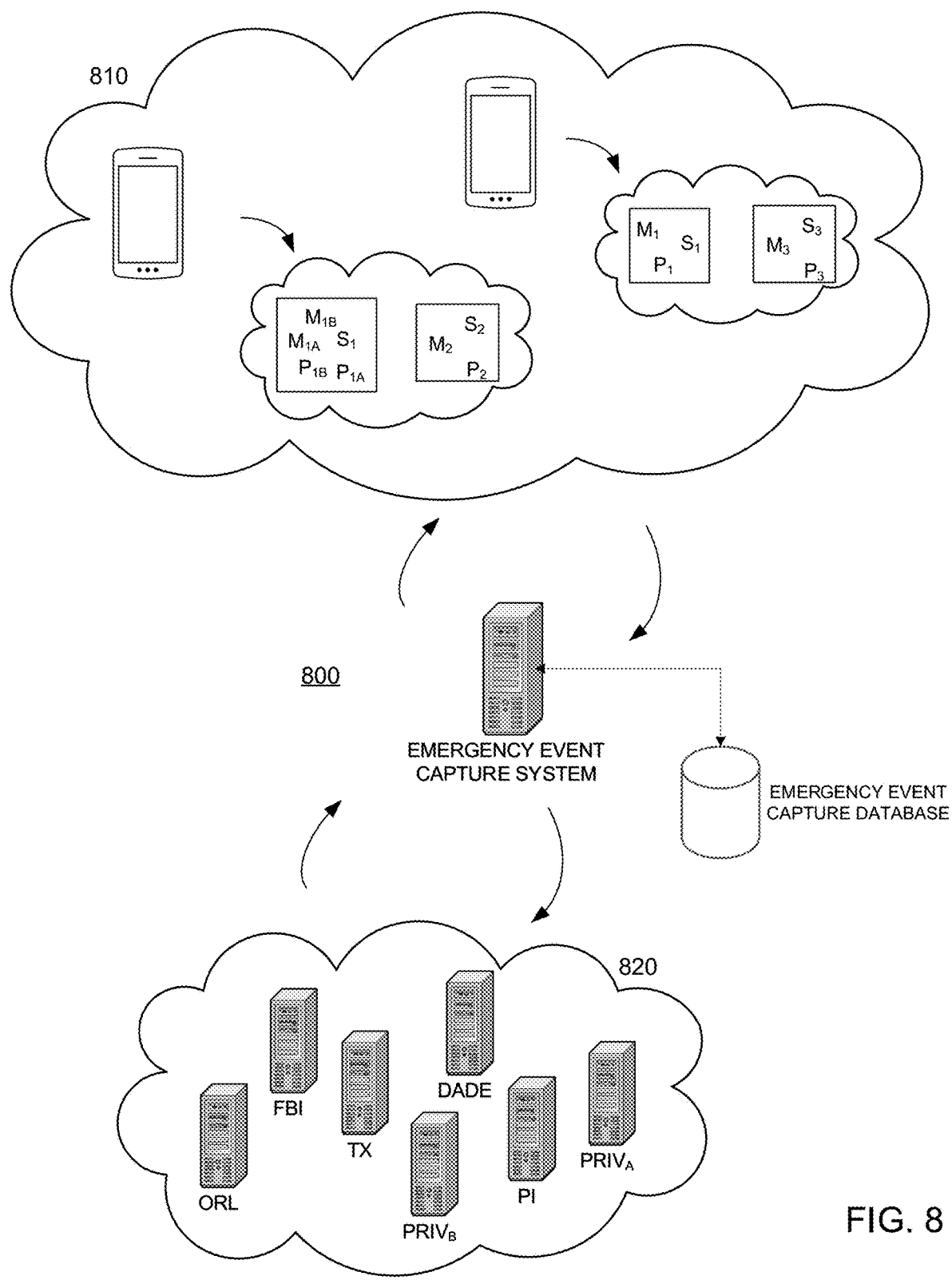
FIG. 8 illustrates an exemplary emergency event capture system, according to some embodiments of the present disclosure.

Referring now to FIG. 8, an exemplary emergency event capture system 800 is illustrated. In some implementations, an exemplary emergency event capture system 800 may record all data and back up data using databases 810 and back up hard drives 820.

In some embodiments, the emergency event capture system 800 may have a specific storage space reserved for each user, for example, 5 terabytes, but may not be limited to a such a specific space. In some embodiments, an emergency event capture system 800 may transfer all media files to backup hard drives 820 after a certain storage space is reached. In some aspects, an emergency event capture system 800 may backup every media file recorded to the backup hard drives 820 in real-time.

In some embodiments, backup hard drives 820 may transfer all media files and notifications to databases 810 across the communication system to be permanently saved. In some implementations, media files may be used for evidence, documentation, or proof for insurance when retrieved from the backup hard drives 820 and databases 810.

In some aspects, a notification device 830 may trigger an automatic save to the backup hard drives 820. For example, the user may have a manually recorded an audio/visual emergency event that is of high priority and may need to be saved immediately. In some embodiments, there may exist a specific button after the recording has ended that the user may tap to store the file immediately.

In some aspects, emergency event data may be captured as packets, wherein each packet is tagged and stored within the emergency event database. Packets may be tagged with emergency event data, such as an identified emergency event, an emergency event type, date, time, location, media types, originating user, or other criteria that may allow for more efficient sorting and storage. In some embodiments, packets may be stored as anonymous or with a user identifier that does not indicate the user's personal details. This may encourage emergency event data capture without users fearing that they would have to be identified by providing the information.

In some embodiments, various external databases may interface with an emergency event system, which may allow various third parties to access emergency event data. Each third party may have different types of access depending on their needs, their purpose, and security requirements. For example, some limited information about emergency events may be publicly available, such as the location, time, and type of an emergency event. This may increase neighborhood awareness of crime in the area without providing captured media or indications of who may be collecting the emergency event data, which may put the user in danger.

As another example, the third party may comprise news sources, such as journalists, newspapers, or news networks. News source access may be limited directly by a gatekeeper, such as law enforcement, who may determine what data is accessible for each emergency event. This may allow for control of release of sensitive or confidential data. For example, a news outlet may have access to general emergency event data but not imagery captured that shows specific individuals who may be suspects, victims, or private citizen bystanders. In some aspects, access may be determined in part by emergency event types. For example, news outlets may have little to no access for emergency events tagged as undercover, mob, or informant, but complete access to emergency events tagged as police brutality, which may be in the public interest to be aware of the details.

As another example, law enforcement and legal teams may have access to the emergency event database. For use in the court system, security and preservation of evidence may be critical for the emergency event data to be usable information. In some embodiments, clear chains of custody and data transfer and storage protocols may apply. For example, block chain technology may be used to ensure that the emergency event data has not been tampered with and authentically captured.

Figure 9:
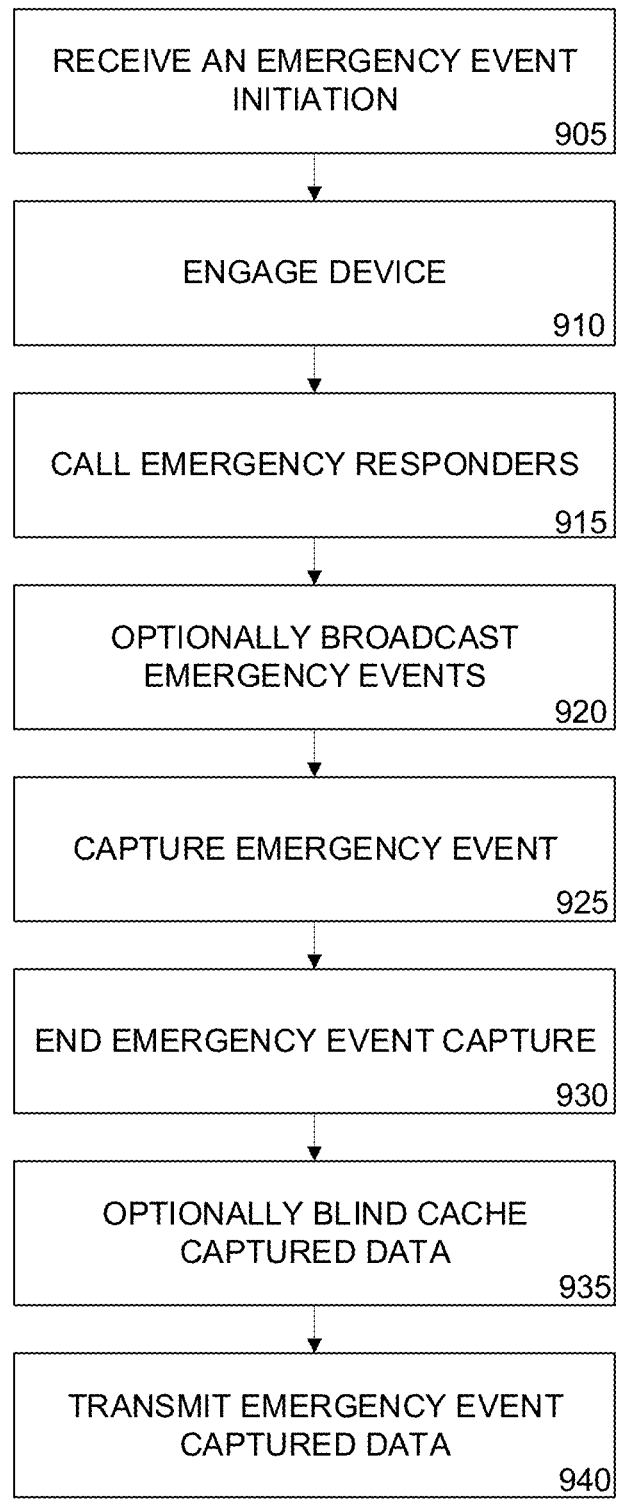
FIG. 9 illustrates exemplary method steps for emergency event capture, according to some embodiments of the present disclosure.

Referring now to FIG. 9, an exemplary emergency event capture process is illustrated. At 905, an emergency event initiation may be received. At 910, a device may be engaged. At 915, emergency responders may be called. At 920, in some embodiments, emergency events may be broadcast, such as to other users, news outlets, or user's emergency contacts, as non-limiting examples. In some implementations, the broadcast may comprise limited information, such as emergency event date, time, location, and type.

At 925, an emergency event data may be captured. At 930, emergency event data capture may end. At 935, in some implementations, captured data may be blind cached, which may limit the risk of accidental or intentional deletion prior to transmission. At 940, emergency event captured data may be transmitted. In some embodiments, once transmitted, the emergency event data may be deleted from local storage, preventing local access to the data. Discoverable emergency event data may put the user at risk if the wrong person finds the data.

In some embodiments, an emergency event capture process have some variations depending on the level of emergency. For example, an immediate threat, such as an active shooter or bomb threat, may follow a different protocol than a natural disaster threat such as a hurricane or tornado. In some embodiments, there may exist no proper protocol for certain notifications.

In some aspects, the emergency event capture process may be customized from the owner of the communication system. In some embodiments, there may exist a different variation of the steps put into play for each individual emergency occurring on each individual communications system. In some implementations, there may exist a default or preset order of the way the protocol is carried out.

Figure 10:
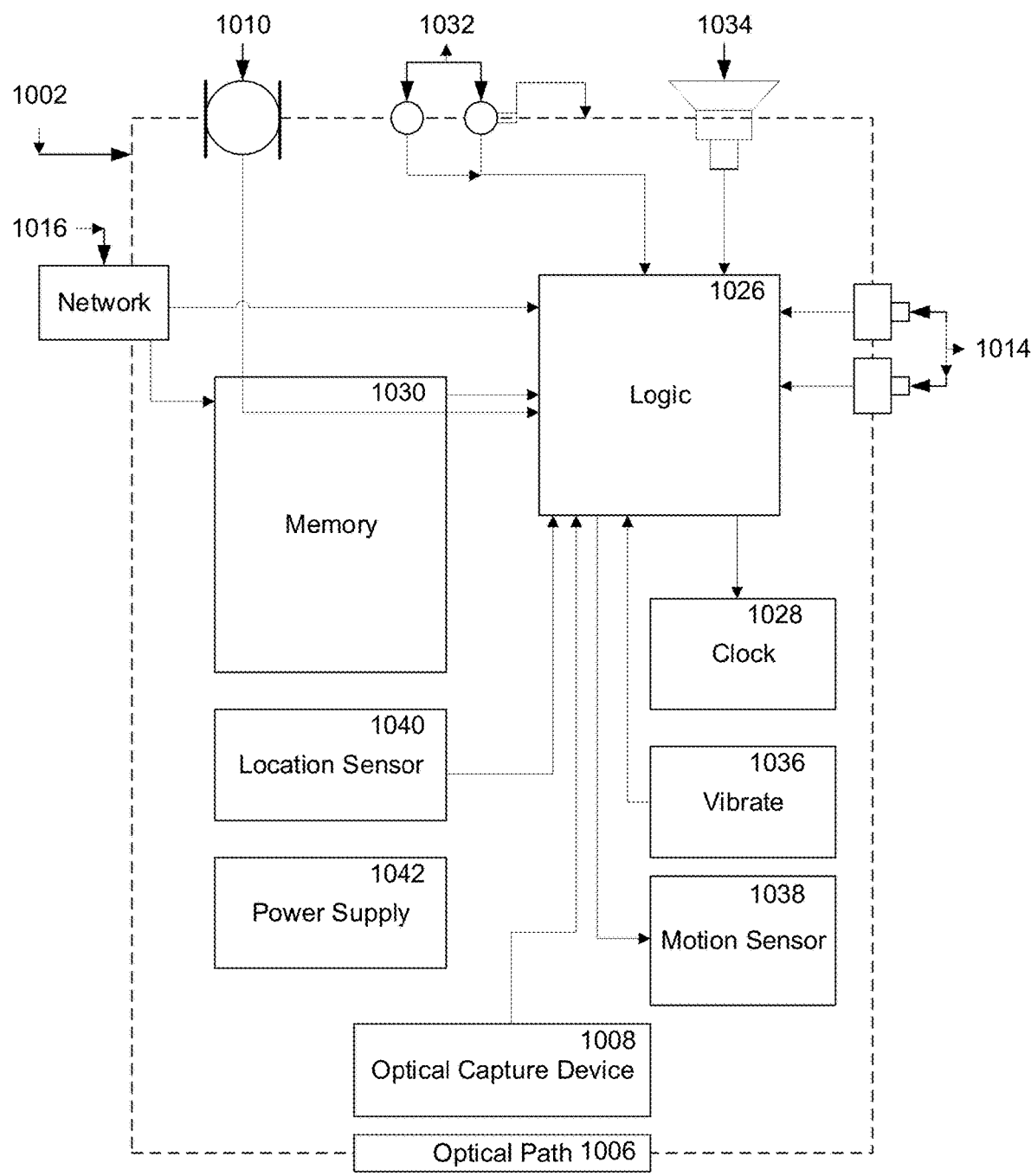
FIG. 10 illustrates an exemplary block diagram of an exemplary embodiment of a emergency event capture device, according to some embodiments of the present disclosure.

Referring now to FIG. 10, an exemplary block diagram of an exemplary embodiment of an emergency event capture device 1002 is illustrated. The emergency event capture device 1002 may comprise an optical capture device 1008, which may capture an image and convert it to machine-compatible data, and an optical path 1006, typically a lens, an aperture, or an image conduit to convey the image from the rendered document to the optical capture device 1008. The optical capture device 1008 may incorporate a Charge-Coupled Device (CCD), a Complementary Metal Oxide Semiconductor (CMOS) imaging device, or an optical sensor of another type.

In some embodiments, the emergency event capture device 1002 may comprise a microphone 1010, wherein the microphone 1010 and associated circuitry may convert the sound of the environment, including spoken words, into machine-compatible signals. Input facilities 1014 may exist in the form of buttons, scroll-wheels, or other tactile sensors such as touchpads. In some embodiments, input facilities 1014 may include a touchscreen display. Visual feedback 1032 to the user may occur through a visual display, touchscreen display, or indicator lights. Audible feedback 1034 may be transmitted through a loudspeaker or other audio transducer. Tactile feedback may be provided through a vibration module 1036.

In some aspects, the emergency event capture device 1002 may comprise a motion sensor 1038, wherein the motion sensor 1038 and associated circuitry may convert the motion of the emergency event capture device 1002 into machine-compatible signals. For example, the motion sensor 1038 may comprise an accelerometer, which may be used to sense measurable physical acceleration, orientation, vibration, and other movements. In some embodiments, the motion sensor 1038 may comprise a gyroscope or other device to sense different motions.

In some implementations, the emergency event capture device 1002 may comprise a location sensor 1040, wherein the location sensor 1040 and associated circuitry may be used to determine the location of the device. The location sensor 1040 may detect Global Position System (GPS) radio signals from satellites or may also use assisted GPS where the emergency event capture device may use a cellular network to decrease the time necessary to determine location. In some embodiments, the location sensor 1040 may use radio waves to determine the distance from known radio sources such as cellular towers to determine the location of the emergency event capture device 1002. In some embodiments these radio signals may be used in addition to and/or in conjunction with GPS.

In some aspects, the emergency event capture device 1002 may comprise a logic module 1026, which may place the components of the emergency event capture device 1002 into electrical and logical communication. The electrical and logical communication may allow the components to interact. Accordingly, in some embodiments, the received signals from the components may be processed into different formats and/or interpretations to allow for the logical communication. The logic module 1026 may be operable to read and write data and program instructions stored in associated storage 1030, such as RAM, ROM, flash, or other suitable memory. In some aspects, the logic module 1026 may read a time signal from the clock unit 1028. In some embodiments, the emergency event capture device 1002 may comprise an on-board power supply 1032. In some embodiments, the emergency event capture device 1002 may be powered from a tethered connection to another device, such as a Universal Serial Bus (USB) connection.

In some implementations, the emergency event capture device 1002 may comprise a network interface 1016, which may allow the emergency event capture device 1002 to communicate and/or receive data to a network and/or an associated computing device. The network interface 1016 may provide two-way data communication. For example, the network interface 1016 may operate according to an internet protocol. As another example, the network interface 1016 may comprise a local area network (LAN) card, which may allow a data communication connection to a compatible LAN. As another example, the network interface 1016 may comprise a cellular antenna and associated circuitry, which may allow the emergency event capture device to communicate over standard wireless data communication networks. In some implementations, the network interface 1016 may comprise a Universal Serial Bus (USB) to supply power or transmit data. In some embodiments, other wireless links known to those skilled in the art may also be implemented.

Figure 11:
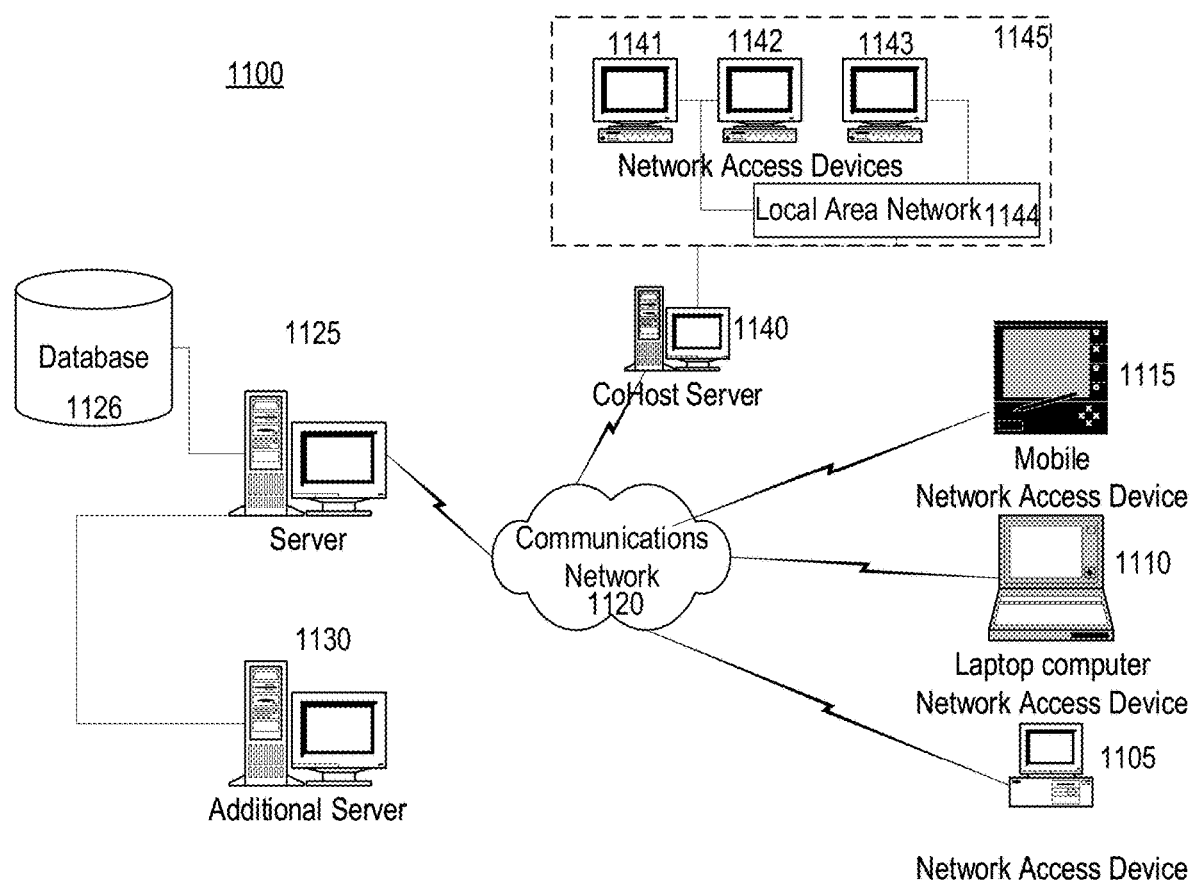
FIG. 11 illustrates an exemplary processing and interface system, according to some embodiments of the present disclosure.

Referring now to FIG. 11, an exemplary processing and interface system 1100 is illustrated. In some aspects, access devices 1115, 1110, 1105, such as a paired portable device 1115 or laptop computer 1110 may be able to communicate with an external server 1125 though a communications network 1120. The external server 1125 may be in logical communication with a database 1126, which may comprise data related to identification information and associated profile information. In some embodiments, the server 1125 may be in logical communication with an additional server 1130, which may comprise supplemental processing capabilities.

In some aspects, the server 1125 and access devices 1105, 1110, 1115 may be able to communicate with a cohost server 1140 through a communications network 1120. The cohost server 1140 may be in logical communication with an internal network 1145 comprising network access devices 1141, 1142, 1143 and a local area network 1144. For example, the cohost server 1140 may comprise a payment service, such as PayPal or a social network, such as Facebook or a dating website.

In some aspects the addition access points 1130 may be local police, fire, news or other computer that the data is transmitted to through the servers 1120. In some respects these additional access points 1130 may receive priority over the data before the database 1110. However, the communication network 1100 may have the ability to simultaneously transmit to both the database 1110 and the additional access points 1130 through each individual server 1120.

In some embodiments the communication system 1100 may be connected to a LAN 1140 for the data to be transmitted faster rather than a Wi-Fi signal. The LAN 1140 may allow for minimal buffering and immediate contact to local first responders.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An emergency event capture system comprising:
  a plurality of external servers configured to receive and store captured emergency event data received from a plurality of handheld emergency event capture devices; and
  a first handheld emergency event capture device configured to capture emergency event data of an emergency event, wherein the first handheld emergency event capture device comprises:
    a plurality of cameras, wherein each camera captures a predefined view,
    a microphone configured to capture audio,
    a geolocation mechanism,
    a wireless communication mechanism,
    memory storage, and
    executable software configured to:
      prompt collection of emergency event data, wherein collection occurs through two or more of the plurality of cameras, the geolocation mechanism, and the microphone,
      prompt storage of emergency event data in the memory storage, wherein the emergency event data is hidden while in the memory storage,
      transmit at least a portion of the emergency event data to at least a portion of the plurality of external servers, wherein the at least a portion of the emergency event data is automatically deleted from the memory storage after the at least a portion of the emergency event data has been transmitted, and
      prompt encryption of emergency event data, wherein encryption prevents access to emergency event data;
  wherein the plurality of external servers are configured to transmit emergency event notifications to a plurality of external devices; wherein the emergency event notifications comprise predefined information from emergency event data, wherein the emergency event notifications comprise at least two different types, wherein each type of emergency event notification corresponds to a different emergency event threat level, wherein the emergency event notifications are automatically prioritized by the emergency event capture system based at least partially on pre-processed emergency event data.

2. The system of claim 1, wherein storage of emergency event data prevents local access to emergency event data.

3. The system of claim 1, wherein collection of emergency event data occurs concurrently.

4. The system of claim 1, wherein the executable software is further configured to transmit the at least a portion of the emergency event data to at least one of: a social media network, a government broadcast system, and a news outlet.

5. An emergency event capture system comprising:
  a plurality of external servers configured to receive and store captured emergency event data received from a plurality of handheld emergency event capture devices; and
  a first handheld emergency event capture device configured to capture emergency event data of an emergency event, wherein the first handheld emergency event capture device comprises:
    a plurality of cameras, wherein each camera captures a predefined view,
    a microphone configured to capture audio,
    a geolocation mechanism,
    a wireless communication mechanism,
    memory storage, and
    executable software configured to:
      prompt collection of emergency event data, wherein collection occurs through two or more of the plurality of cameras, the geolocation mechanism, and the microphone,
      prompt storage of emergency event data in the memory storage, wherein the emergency event data is hidden while in the memory storage,
      transmit at least a portion of the emergency event data to at least a portion of the plurality of external servers, wherein the at least a portion of the emergency event data is automatically deleted from the memory storage after the at least a portion of the emergency event data has been transmitted,
      prompt encryption of emergency event data, wherein encryption prevents access to emergency event data, and
      prompt an emergency event capture notification that indicates emergency event capture, wherein the emergency event capture notification comprises a dying battery icon, wherein the dying battery icon indicates emergency event capture and does not represent a dying battery.

6. The system of claim 5, wherein storage of emergency event data prevents local access to emergency event data.

7. The system of claim 5, wherein collection of emergency event data occurs concurrently.

8. The system of claim 5, wherein the executable software is further configured to transmit the at least a portion of the emergency event data to at least one of: a social media network, a government broadcast system, and a news outlet.

\* \* \* \* \*